US006416253B1

(12) United States Patent
Wimp et al.

(10) Patent No.: US 6,416,253 B1
(45) Date of Patent: Jul. 9, 2002

(54) ABRASIVE RESISTANT OPEN CELL ARTICULATED SEABED MAT

(75) Inventors: Thomas E. Wimp; Kenneth L. McAllister; Derek W. Dice; David B. Kees, all of Bowling Green, KY (US)

(73) Assignee: Lee Masonry Products, LLC, Bowling Green, KY (US)

( * ) Notice: Subject to any disclaimer, the term of this patent is extended or adjusted under 35 U.S.C. 154(b) by 0 days.

(21) Appl. No.: 09/563,171

(22) Filed: May 2, 2000

(51) Int. Cl.⁷ .................................................. F16L 1/12
(52) U.S. Cl. ........................ 405/172; 405/17; 405/19; 405/35; 405/158
(58) Field of Search .................... 405/17, 172, 107, 405/15, 16, 18, 19, 20, 33, 21, 35, 39, 49, 64, 80, 81, 118, 25, 27, 30, 158; 404/34; 52/606, 585.1

(56) References Cited

U.S. PATENT DOCUMENTS

| | | | |
|---|---|---|---|
| 3,386,252 A | | 6/1968 | Nelson |
| 4,227,829 A | | 10/1980 | Landry, Jr. |
| 4,375,928 A | | 3/1983 | Crow et al. |
| 4,477,206 A | | 10/1984 | Papetti et al. |
| 4,683,156 A | | 7/1987 | Waters |
| 4,781,492 A | | 11/1988 | Shindo |
| 5,040,350 A | * | 8/1991 | Panther ........................ 52/704 |
| 5,108,222 A | | 4/1992 | Jansson et al. |
| 5,160,215 A | * | 11/1992 | Jensen ........................ 404/46 |
| 5,443,329 A | | 8/1995 | de Geeter |
| 5,484,230 A | * | 1/1996 | Rudolff ........................ 405/20 |
| 5,632,571 A | | 5/1997 | Mattox |
| 5,722,795 A | | 3/1998 | Angel et al. |

(List continued on next page.)

FOREIGN PATENT DOCUMENTS

| | | | |
|---|---|---|---|
| EP | 0152232 A2 | 8/1985 | |
| GB | 2139676 A | * 2/1983 | ............. E02B/3/04 |

OTHER PUBLICATIONS

Webpage, SUBMAR Inc., www.submar.com/pat_tech.html, disclosing permanent mat anchoring system to concrete blocks, 1 page.*

Offshore Rescue, by Jonathan French et al., "Civil Engineering" Jul., 1994, as posted on the Armortec.com website.*

Key to Road Alignment, author not stated, "California Builder & Engineer (CB&E)", Jan. 16, 1995, as posted on the Armortec.com website.*

Armortec Experiences with Embankment Dam Overtopping Protection; Powledge et al., Hydro–Review, Feb. 1994, as posted on the Armortec.com website.*

Primary Examiner—David Bagnell
Assistant Examiner—Katherine W Mitchell
(74) Attorney, Agent, or Firm—Laura M. Hagan

(57) ABSTRACT

Concrete blocks with an open cell structure extending throughout the block are assembled in substantially parallel columns and rows to from a mat structure capable of articulating over underwater structures. The blocks are assembled by flexible cables that pass through the center of each block through perpendicular apertures, which are located on different horizontal planes to prevent intersection of the cables. A removable abrasive resistant pad is placed on one surface of the blocks to prevent the concrete block from causing damage to the structure. The pad is comprised of a solid base with an opening matching the opening on the block. It also has a plurality of upwardly extending post which serve as a contact point between the pad and the underwater structure and at least one self-locking dowel extending downward, which are inserted into dowel holes on one surface of the block, after the concrete has hardened. The entire pad is one homogeneous material. The size of the mat is capable of being modified on site.

27 Claims, 14 Drawing Sheets

U.S. PATENT DOCUMENTS

| | | |
|---|---|---|
| 5,775,838 A | 7/1998 | Pettee, Sr. |
| 5,846,023 A | 12/1998 | Angel et al. |
| 5,906,456 A | 5/1999 | Knight |
| 5,911,539 A * | 6/1999 | Egan et al. .................. 405/20 |
| 5,921,710 A | 7/1999 | Scales |
| 5,944,449 A | 8/1999 | Angel et al. |
| 5,971,658 A | 10/1999 | Pramono |
| 5,975,796 A | 11/1999 | Angel et al. |
| 5,988,942 A | 11/1999 | Atkinson |
| 6,027,285 A | 2/2000 | Angel et al. |

* cited by examiner

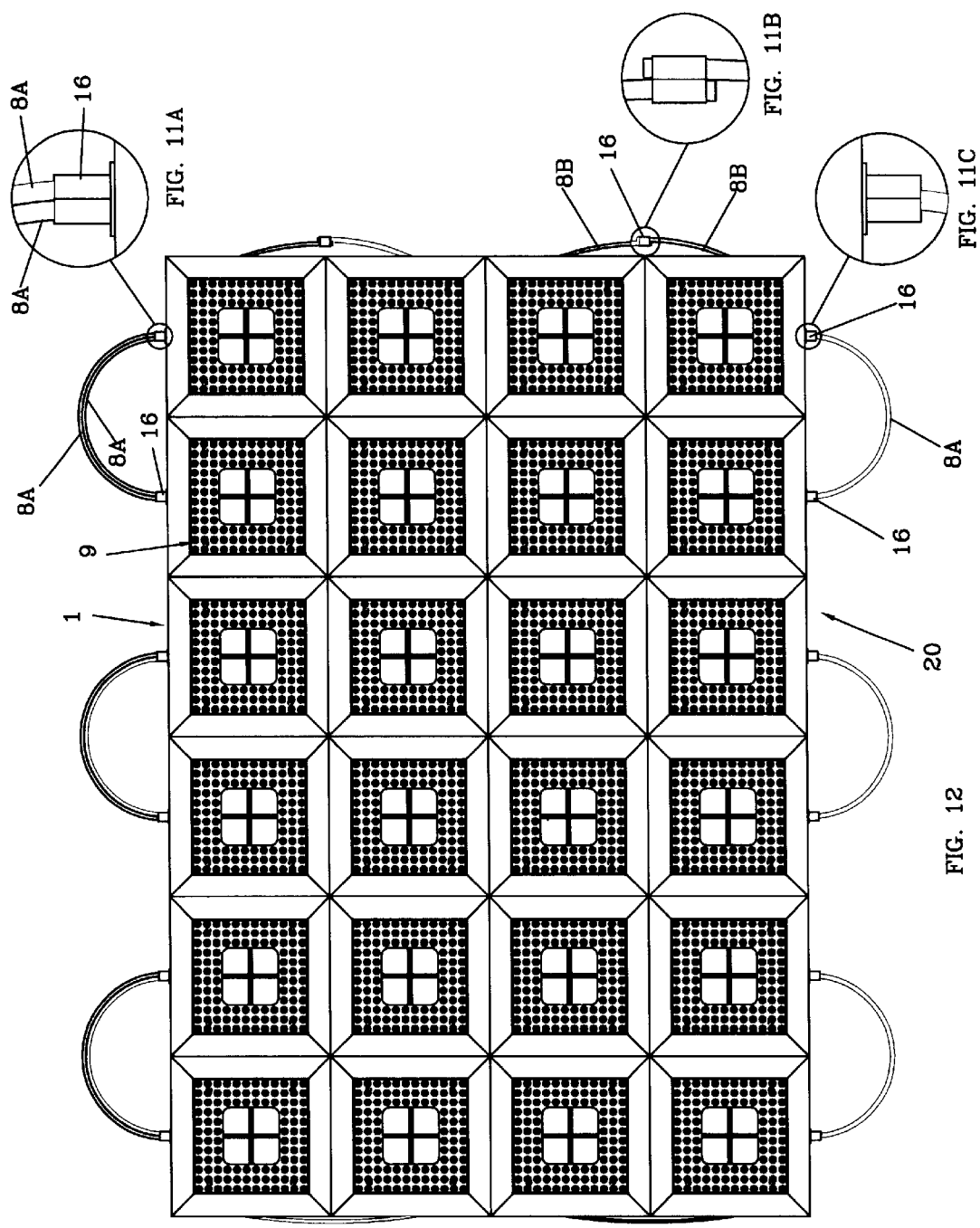

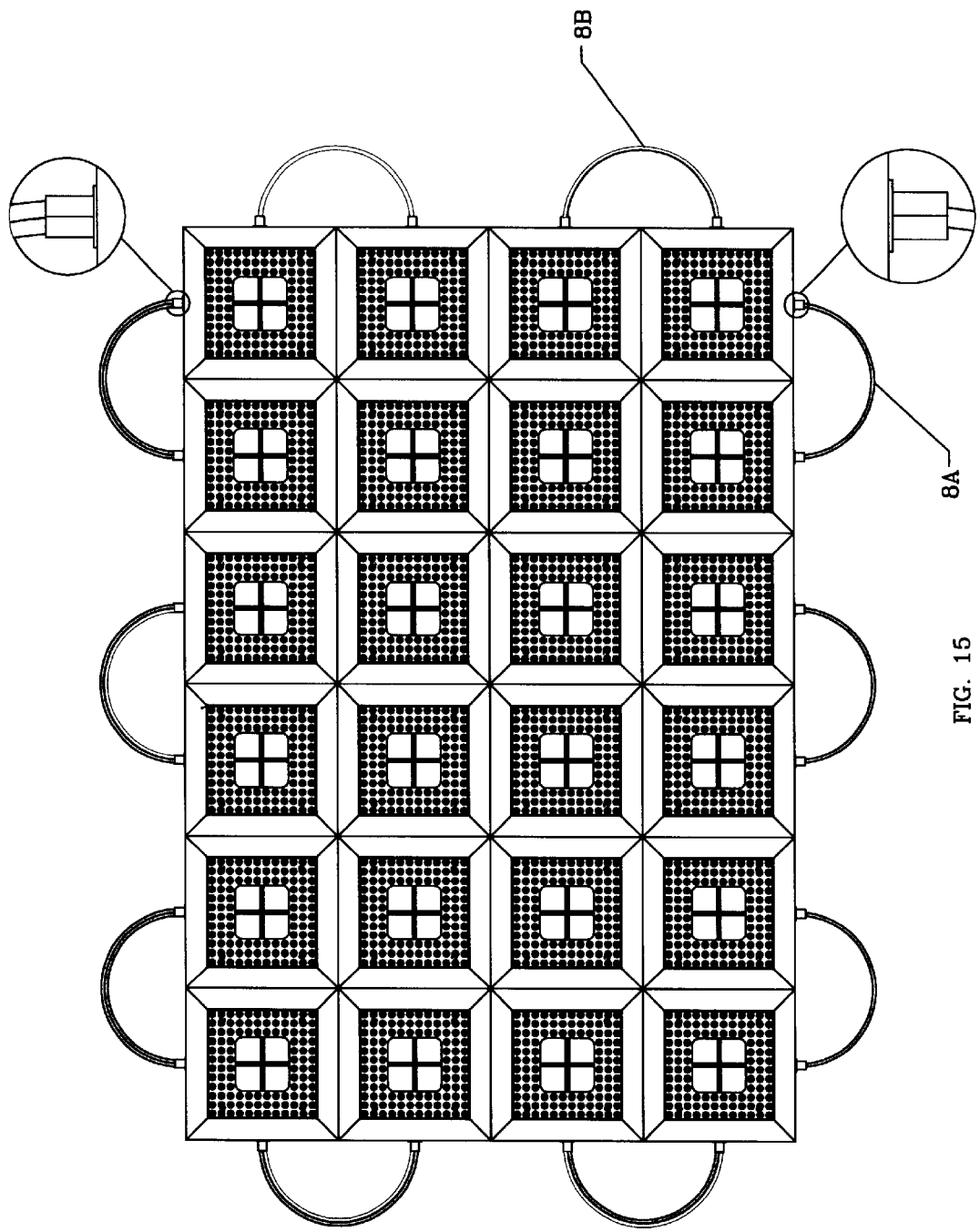

ABRASIVE RESISTANT OPEN CELL ARTICULATED SEABED MAT

BACKGROUND OF THE INVENTION

Numerous types of mats can accomplish stabilization and protection to underwater pipes and other seabed installations in off shore applications. Hydrodynamic forces, which are generated by the bottom currents and waves, create a need for a stabilization technique, such as a seabed mat. Prevention of erosion of the adjoining seabed is also another benefit created by seabed mats. Examples of articulated mats, their components, and their uses are given in U.S. Pat. Nos. 5,722,795, 5,944,449 and 5,443,329.

Concrete has typically been used as the covering of choice because of its strength and strong resistance to the action of natural types of water. However, many underwater pipelines are covered with a thin-filmed epoxy coating that is used as a protection system. If this epoxy coating is scratched, the pipeline is subject to corrosion. Therefore some mats have utilized pads in conjunction with an articulated mat in an effort to prevent the concrete from scratching or damaging the epoxy coating of the underwater pipelines. Additionally, cathodic protection is utilized as a maintenance system to prevent corrosion of the underwater pipelines.

The structure of prior art mats cause various problems in their use due to their closed cell design and inability to alter or vary the existing mat at the location of installation as shown in U.S. Pat. Nos. 5,722,795 and 5,944,449. The closed cell design on other abrasive resistant articulated mats provides an increased and unnecessary surface area abutting with the underwater pipeline or other seabed installation, thereby increasing the possibility of damage occurring to the underwater pipeline or seabed installation and decreasing the effectiveness of any accompanying cathodic protection system. The closed cell design also creates unnecessary weight on the mat, which greatly increases the difficulty of installing the product. Finally, the prior art does not provide for a means of modification of the mat at the installation location, in order to accommodate various situations, such as pipeline valves.

There is a need in the art for an abrasive resistant articulated seabed mat that is lighter weight and thus easier to install and also provides for a significant decrease in the surface area abutting the underwater structure thereby decreasing the possibility of the mat damaging the structure and maximizes the use of any cathodic protection system. There is also a need for an abrasive resistant articulated seabed mat that is capable of modification at the location of installation in order to accommodate various situations.

SUMMARY OF THE INVENTION

The present invention provides for an abrasive resistant open cell articulated seabed mat. The mat is made up of concrete blocks which each have a single square opening formed from the upper portion of the block through the center and continuing to the lower portion of the block. The top and bottom surface of the block is flat. One of the flat surfaces, preferably the surface adjacent the protected material, contains a solid abrasive resistant pad attached to the block.

The abrasive resistant pad is designed with an opening to match the opening on the block and with upwardly extending posts, which serve as the contact point between the concrete mat and the underwater pipeline. The structure of the pad and the open cell structure of the block, allows water to freely circulate between the mat and the pipeline. This combination of the open cell structure of the block and the structure of the abrasive resistant pad significantly reduces the surface area of the mat that actually abuts with the underwater pipeline or other structure. This decreases the possibility that the mat will damage the underwater pipeline or other structure. Additionally, if a cathodic protection system is utilized to provide additional protection to the underwater pipeline or structure, the combination of the open cell structure of the block and the structure of the abrasive resistant pad allows for a maximum utilization of any cathodic protection.

The abrasive resistant pad is attached to the surface of the block by a plurality of self-locking dowels extending downward from the pad. The entire pad is comprised of a homogeneous material. Although the pad could be made from various materials, the preferred embodiment of the pad is composed of a high-density polyethylene, although other substances such as low-density polyethylene, polyvinyl chloride, nylon or other mixtures thereof could be utilized. Each block contains apertures in its top surface, which receive the self-locking dowels located on the pad and serves to attach the pad to the block. An adhesive may also be utilized within the apertures, which receive the self-locking dowels to provide additional support for maintaining the pad in place on the top surface of the block.

The open cell design of the present invention allows the mat to be placed into the water more easily, especially in situations where large waves are present on the water's surface. By allowing water to flow through the open cell design of the block, the blocks are able to be placed more accurately while the divers orienting the mats into place are exposed to less dangerous conditions. Other closed cell articulated seabed mats thwart vertical movement of water through the mat and therefore, are much more difficult to place in deep columns of water. Additionally, in situations where the mat has to be pulled up after placement to be reset, the amount of water to be displaced in a closed cell seabed mat is significantly greater than the amount displaced by an open cell.

The open cell design of the mat also allows for the open areas, to be filled with sand or other natural materials if desired. If suspended sediment is in the current, it is allowed to drop into the open cell design and thus provides additional roughness and stability to both the mat and the pipeline.

The present invention also allows for the size of the mat to be dynamically altered at any time, including the site of installation. The concrete blocks, which make up the mat, contain perpendicular apertures extending therethrough on each side of the block. The apertures are placed so as to allow a cris-crossing of cables through the block without intersecting. To form a mat, the blocks are aligned in a rows and columns wherein each column is substantially parallel with the other columns and wherein each row is substantially parallel with the other rows. A flexible cable is laced through the perpendicular apertures of each block. A single cable is used to attach two columns of blocks. The end pieces of cable, extending from the end of the adjacent columns of blocks, are extended so as to form a loop, utilized when handling the mat. Each of the end pieces of cable is connected with the cable extending from the end block on the adjacent column of blocks with a non-corrosive compression sleeve. The cable extending from the opposite end of the column of blocks also forms a loop.

A sleeve is placed on the cable next to the end block of each column. The loop extending from each of the columns is used for handling of the mat. The placement of the compression sleeves next to the apertures of the blocks, serve to hold the blocks securely in a column. Once the compression sleeve is placed in its proper location, it is closed or crimped together. The compression sleeve must be sufficiently large enough to prevent slipping into the aperture of the block.

The rows of the mat are connected in the same fashion as the columns, with one piece of cable connecting two rows. However, since typically all four sides of the mat will not be utilized while handling, the cables on the rows can be pulled tight with only one compression sleeve connecting the end pieces of cable extending from the end of the two rows.

The ability of the present invention to be altered as needed allows for great flexibility for the manufacturer and the consumer of the mat. A manufacturer is capable of making any size mat that a customer requires. Additionally, a customer is capable of modifying the size of the mat at any time, including at the site of installation. This allows the consumer to address unexpected needs that may arise during the installation of the mat.

The present invention also allows for the creation and manufacturing of the blocks to be separated from the attachment of the pads. This provides the customer the ability to replace pads, which may become damaged during transport or in the installation process. The consumer also has the ability to place the needed pads at the site of installation.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 11A is a front view of the compression sleeve with two portions of a cable inserted and placed at the end of a column of blocks;

FIG. 11B is a front view of the compression sleeve with two end pieces of a cable inserted and placed at the end of two rows of blocks;

FIG. 11C is a front view of the compression sleeve with one portion of a cable inserted and placed at the end of a column of blocks;

FIG. 12 is a top view of the abrasive resistant open cell seabed mat showing loops extending from the ends of the columns;

FIG. 15 is a top view of the abrasive resistant open cell seabed mat, showing loops extending from the end of both the columns and rows.

DETAILED DESCRIPTION OF THE PREFERRED EMBODIMENT

Figure 1:
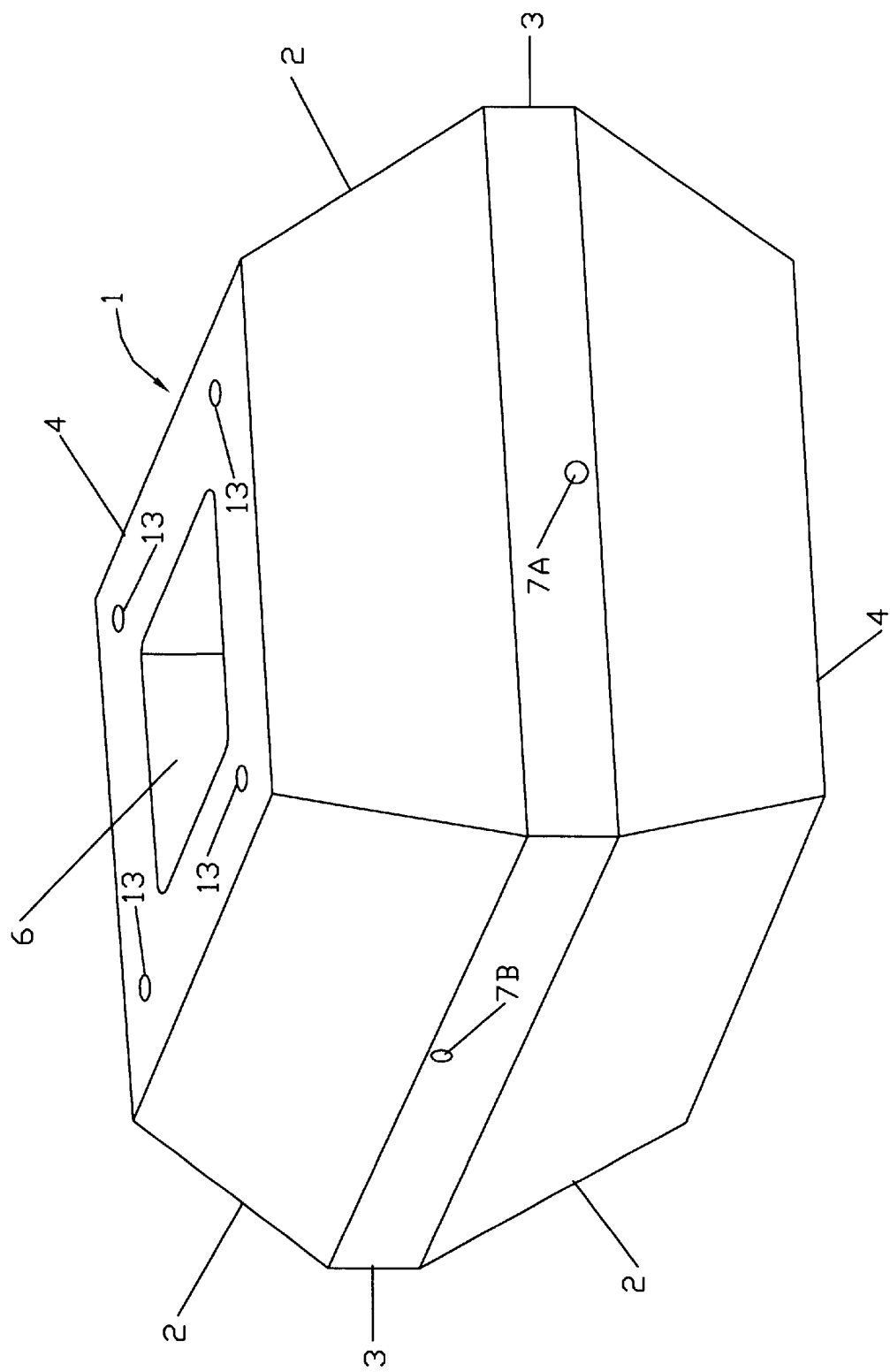
FIG. 1 is a perspective view of a single concrete block of the present invention.

An initial component of the present invention is a concrete block 1 with an open cell 6. Although there are a number of suitable shapes in the prior art, the preferred embodiment is shown in FIG. 1 and is an upper and lower concrete trapezoidal shaped units 2, with lower rectangular portions 3 abutting each other and the upper portions truncated forming flat surfaces 4 as shown in FIG. 1. The block 1 contains an open cell 6 that extends through the interior of the block 1. The shape of the open cell 6 can consists of various geometrical shapes; however, the disclosed shape is a single square opening formed from the upper portion of the block through the center and continuing to the lower portion of the block.

Figure 2:
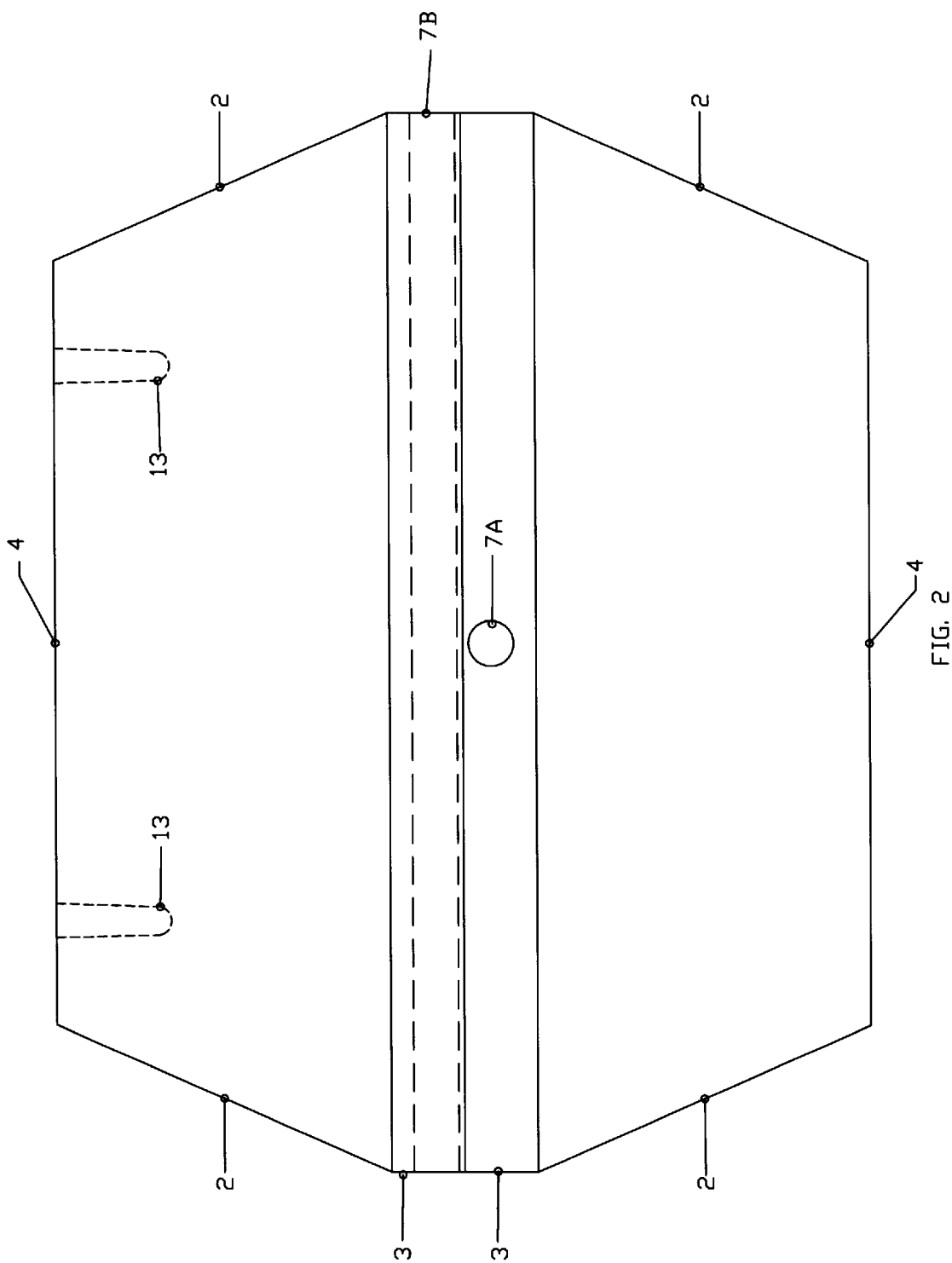
FIG. 2 is a side sectional view of a single concrete block of the present invention.

The blocks 1 have perpendicular apertures 7A and 7B, extending there through on each side of the block 1. Although perpendicular, these apertures 7A and 7B are set in different horizontal planes and do not intersect, as is shown in FIG. 2. One aperture 7A receives cables 8A used to place the blocks 1 into columns and the other aperture 7B receives cables 8B used to place the blocks 1 into rows to form a seabed mat 20 as shown in FIG. 12 and 15. The apertures 7A and 7B allow for the cables 8A and 8B to be inserted and removed from the blocks 1 as needed since the cables 8A and 8B are not embedded into the blocks 1. Calcium chloride, a typical component of concrete, has been known to cause damage to cables, which are embedded into a concrete structure. The use of apertures 7A and 7B to lace the cables 8A and 8B through the blocks 1 prevents the possibility of the cable experiencing any damage or corrosion due to the calcium chloride present in the concrete. Thus it is desirable to insure that the cables 8A and 8B are not embedded within the concrete block 1 structure, as it will promote advanced decomposition of the cable.

An example of the seabed mat 20 comprised of columns and rows of blocks 1 is shown in FIG. 12 and FIG. 15. The blocks 1 are aligned in columns and rows wherein each column is substantially parallel with the other columns and wherein each row is substantially parallel with the other rows. A single piece of cable 8A is utilized to attach two columns of blocks 1. The end pieces of the cable 8A extend from the end of the adjacent columns of blocks and attach to each other so as to form a loop. A portion of the cable 8A is also extended from the opposite end of the row of blocks 1 so as to form a loop, as is shown in FIG. 12. These loops assist with the lifting, handling and installation of the seabed mat 20. A non-corrosive compression sleeve 16 is attached to the cable 8A at the point it extends from each end block 1 on the column as is shown in FIG. 11A and 11C. Each end piece of the cable 8A, which extends from a column, is connected by a compression sleeve 16 to in the portion of the cable 8A extending from the adjacent column, shown in specifically in FIG. 11A. Therefore, on one end of the column, the loop is comprised of two strands of cable 8A.

Figure 10:
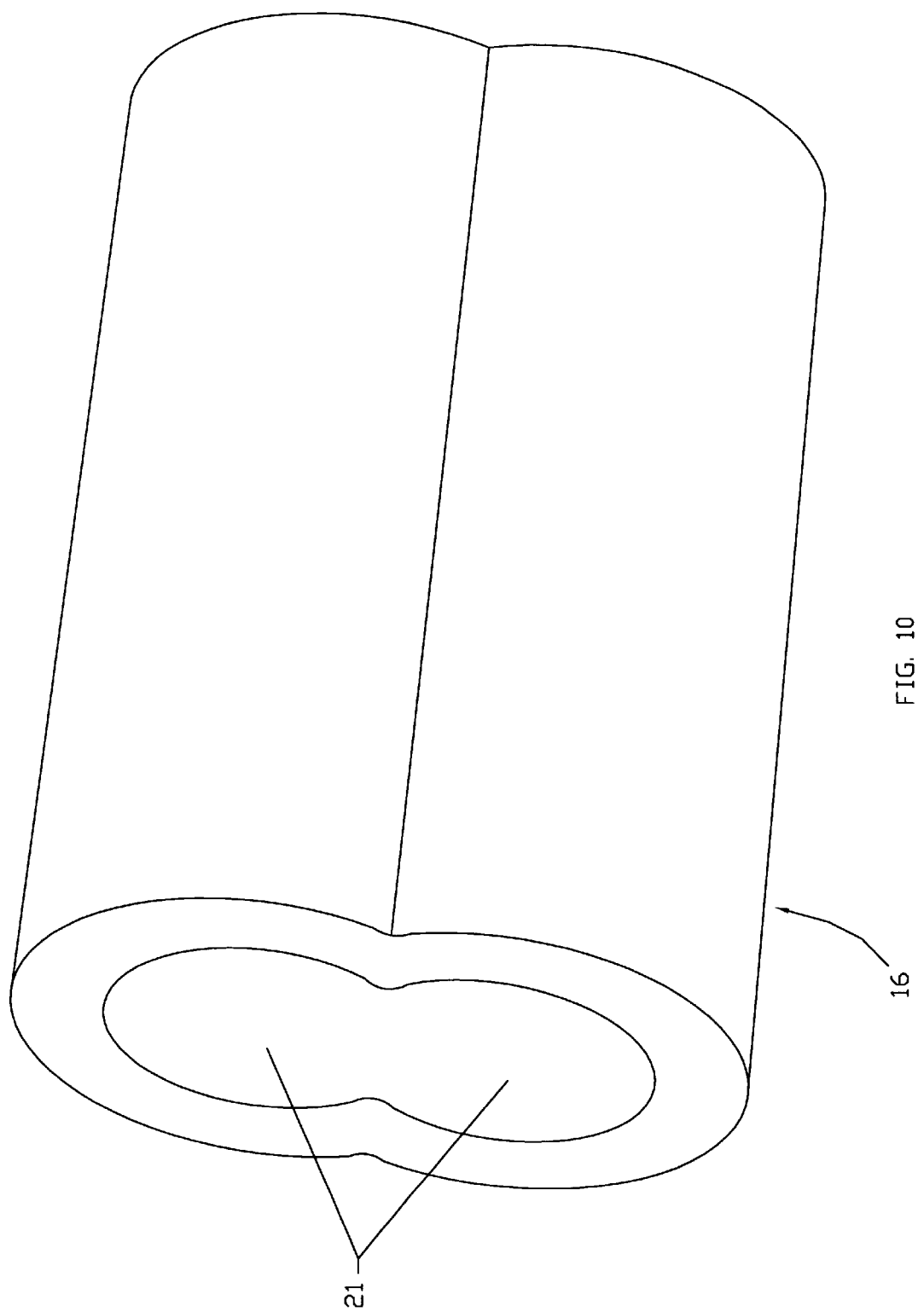
FIG. 10 is a perspective view of a compression sleeve.

FIG. 10 shows a compression sleeve 16, which is cylindrical with two round openings 21 abutting together, capable of receiving two pieces of the flexible cable. The compression sleeve 16, is typically are comprised of copper or an aluminum alloy, for example. The compression sleeve 16 is placed at the aperture 7A of the end block 1 on each of the columns. The compression sleeves 16 are sufficiently large enough to prevent them from slipping into the interior of the apertures 7A. The compression sleeves serve to securely hold the blocks 1 in a column.

A single piece of cable 9B is also utilized to connect two rows of blocks 1. The cable 8B extends from the end block 1 on each of these rows and may be connected in the same fashion as the columns, as is shown in FIG. 15. A compression sleeve 16 is placed at the aperture 7B of the end block 1 on each of the rows. The compression sleeves 16 are sufficiently large enough to prevent them from slipping into the interior of the apertures 7B and serves to securely hold the blocks 1 in a row. An alternative way of assembling the rows of blocks 1 is shown in FIG. 11B, which demonstrates how the inserted cable 8B can be pulled tight with the two end pieces of the cable connected with a compression sleeve 16, without a loop being present on either end of the row. This alternative assembly is shown in FIG. 12.

Figure 3:
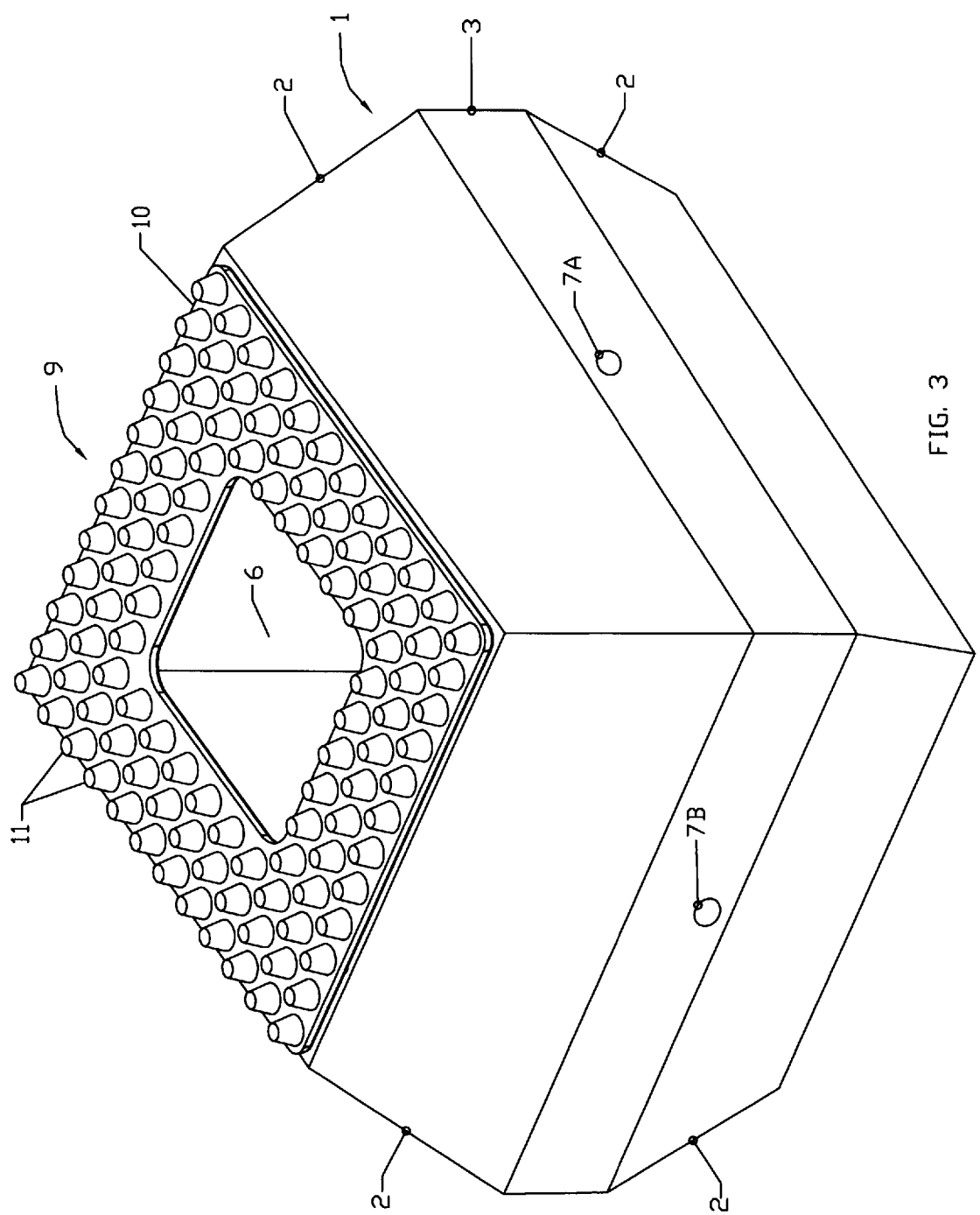
FIG. 3 is a perspective view of a single concrete block of the present invention with an abrasive resistant pad.
Figure 4:
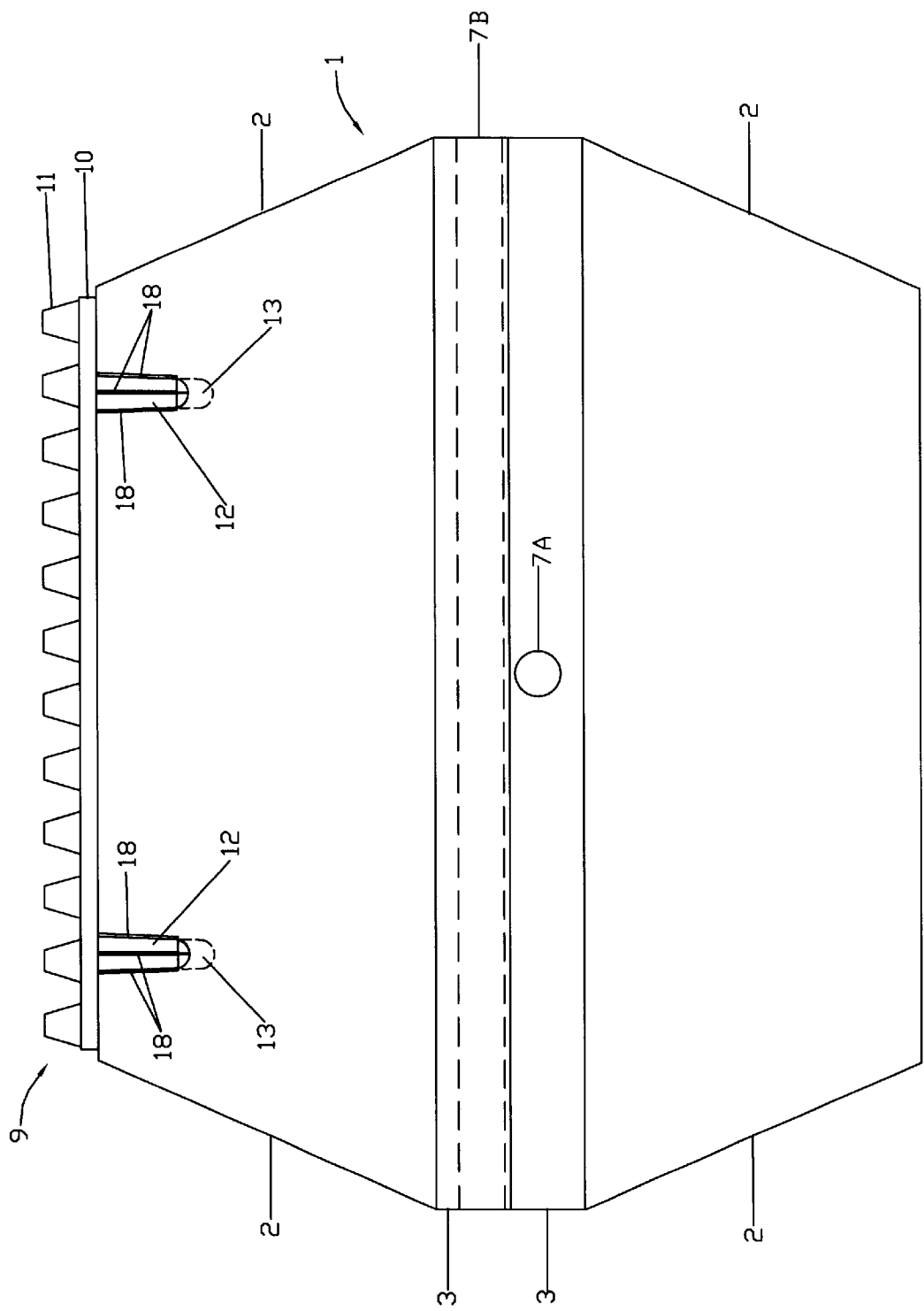
FIG. 4 is a side sectional view of a single block with an abrasive resistant pad.
Figure 5:
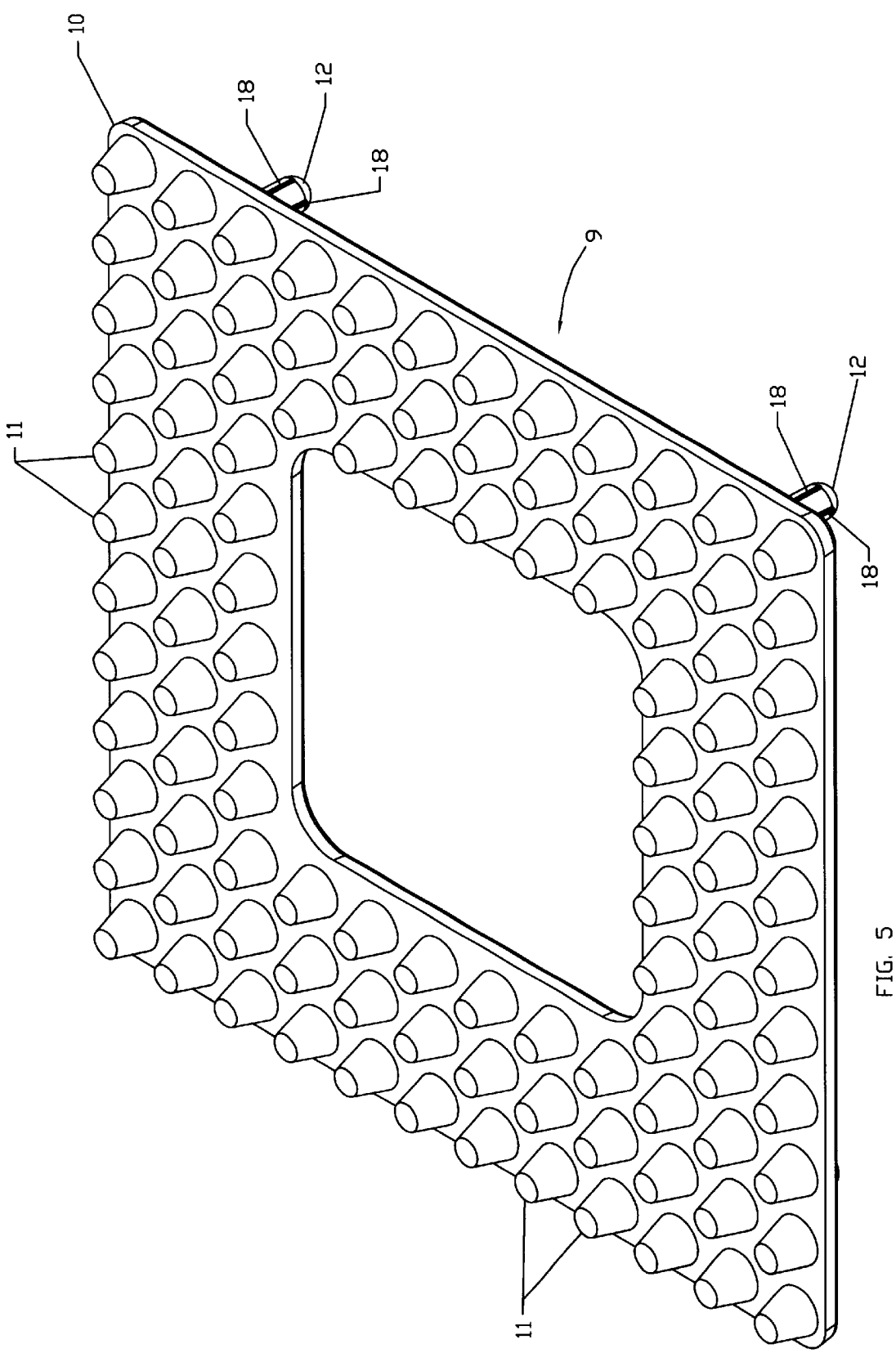
FIG. 5 is a perspective view of an abrasive resistant pad of the present invention.
Figure 6:
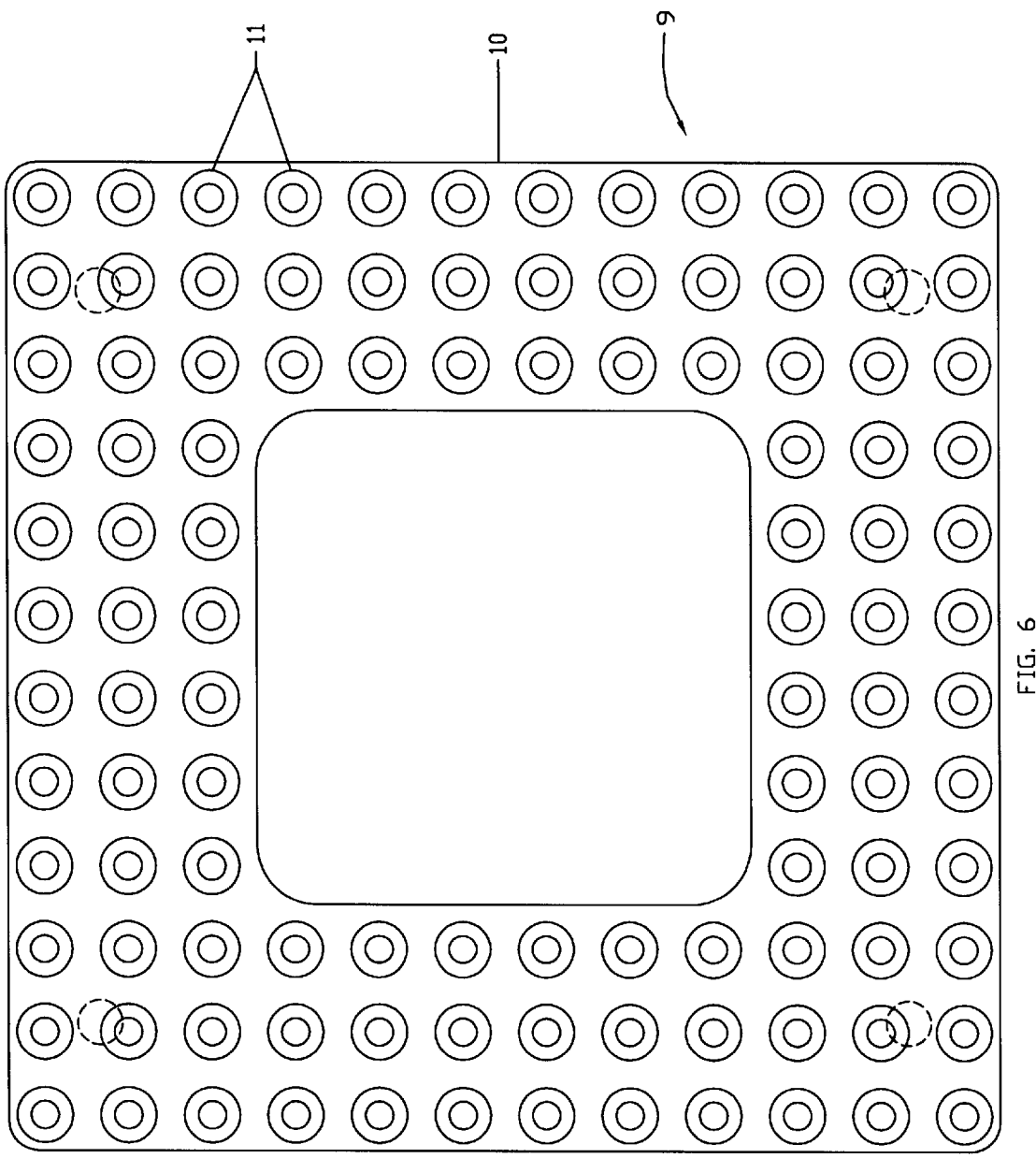
FIG. 6 is a top view of an abrasive resistant pad shown in FIG. 5.
Figure 7:
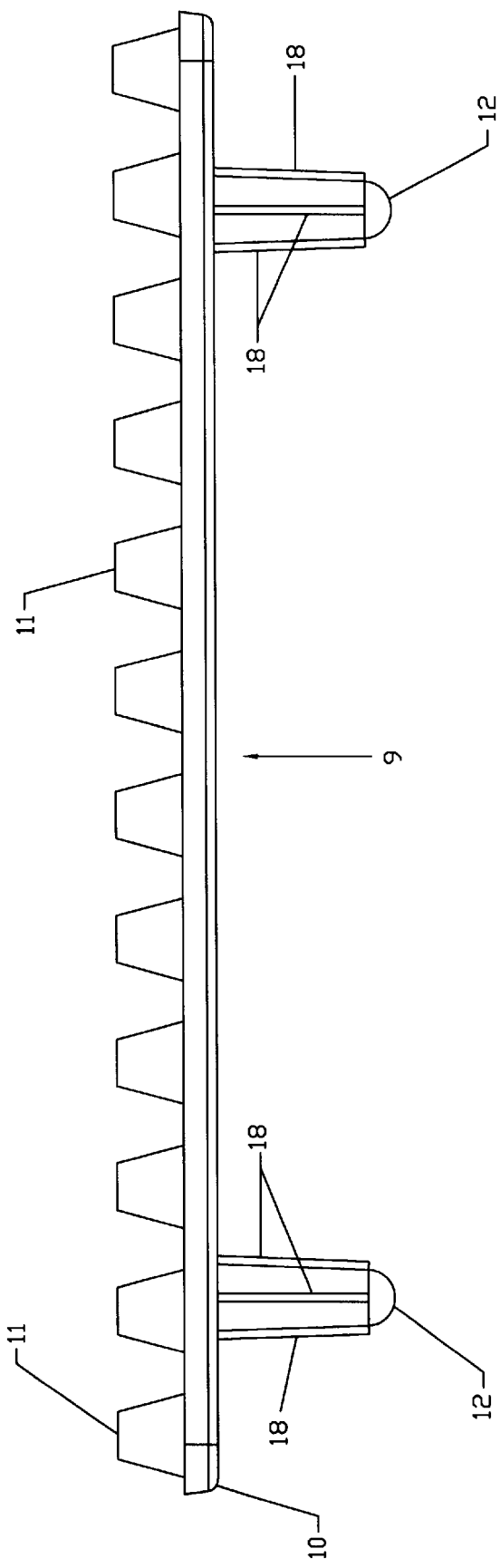
FIG. 7 is a side profile of the abrasive resistant pad of the present invention.

One purpose of the mat 20 is to provide protection of underwater installation and the stabilization of the seabed near the installation. This purpose is accomplished by use of an abrasive resistant pad 9 placed on the top surface of each block 1 as is shown in FIGS. 3 and 4. FIGS. 5, 6, 7 and 8 each shows the abrasive resistant pad of the present invention. The pad 9 is comprised of a solid base portion 10 with an opening to match the open cell 6 of the block. The base 10 is covered with a plurality of upwardly extending posts 11, extending outward from the solid base portion 10 of the pad 9.

Figure 13:
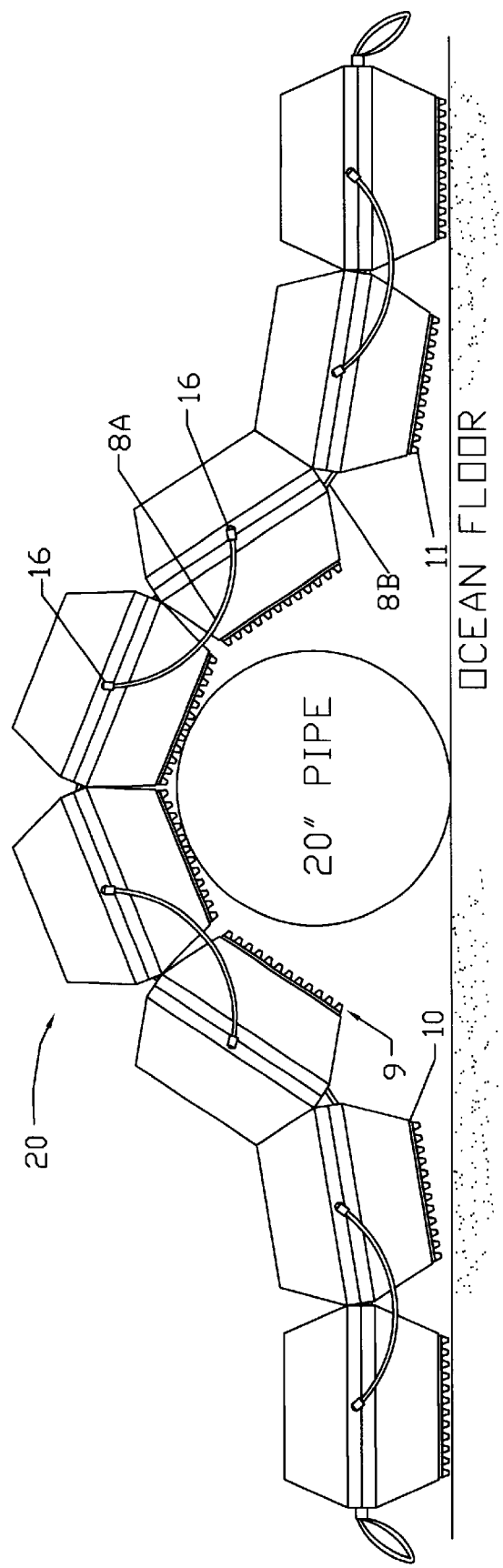
FIG. 13 is a side view of the abrasive resistant open cell seabed mat articulating over an underwater pipeline.
Figure 14:
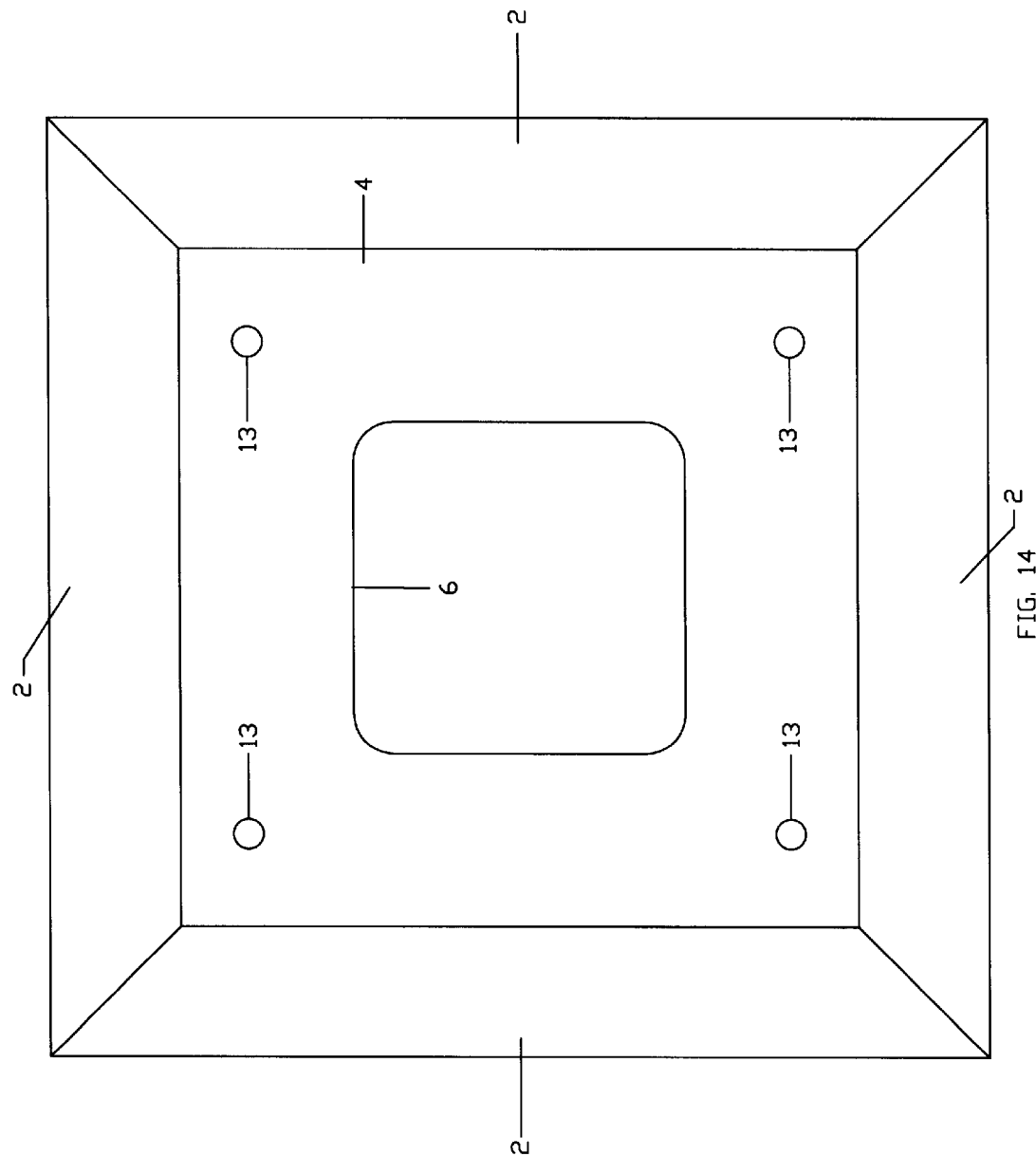
FIG. 14 is a top view of a single concrete block using the design of the present invention.

The upwardly extending posts 11 provide a contact point between the blocks 1 and the seabed or underwater installation being over-laid by the pad 9 and the block 1, as is shown in FIG. 13. Particularly, the posts 11 provide an anti-abrasion material to protect against the creation of defects in the coating of underwater pipeline.

Even a well-coated pipeline will have some coating defects, thus cathodic protection is often utilized in conjunction with the epoxy coating of underwater pipes in order to maintain the integrity of the underwater pipeline or structure. Cathodic protection is an electrochemical process that provides an abundant supply of electrons to the surface of a steel structure undergoing corrosion so that no positive metal ions (rust) can form at the interface of the structure and the electrolyte (seawater). Cathodic protection requires electrical current to flow thru the electrolyte (seawater) to the damaged areas of a pipeline coating system. Anodes then deteriorate and prevent corrosion of the pipeline.

The abrasive resistant pad 9 may be made from a high-density polyethylene (HDPE), which is not known to induce cathodic shielding. Other substances such as low-density polyethylene, polyvinyl chloride, nylon or other mixtures thereof could also be utilized in the pad 9. The open cell 6 of the block 1 along with the design of the abrasive resistant pad 9 provides for an increase in the overall access of the electrical current to the damaged areas of the pipeline, which allows cathodic protection systems to prevent pipeline corrosion. The more area allowed to be exposed to the electrical current of cathodic protection, the more protection to the underwater pipeline.

Figure 8:
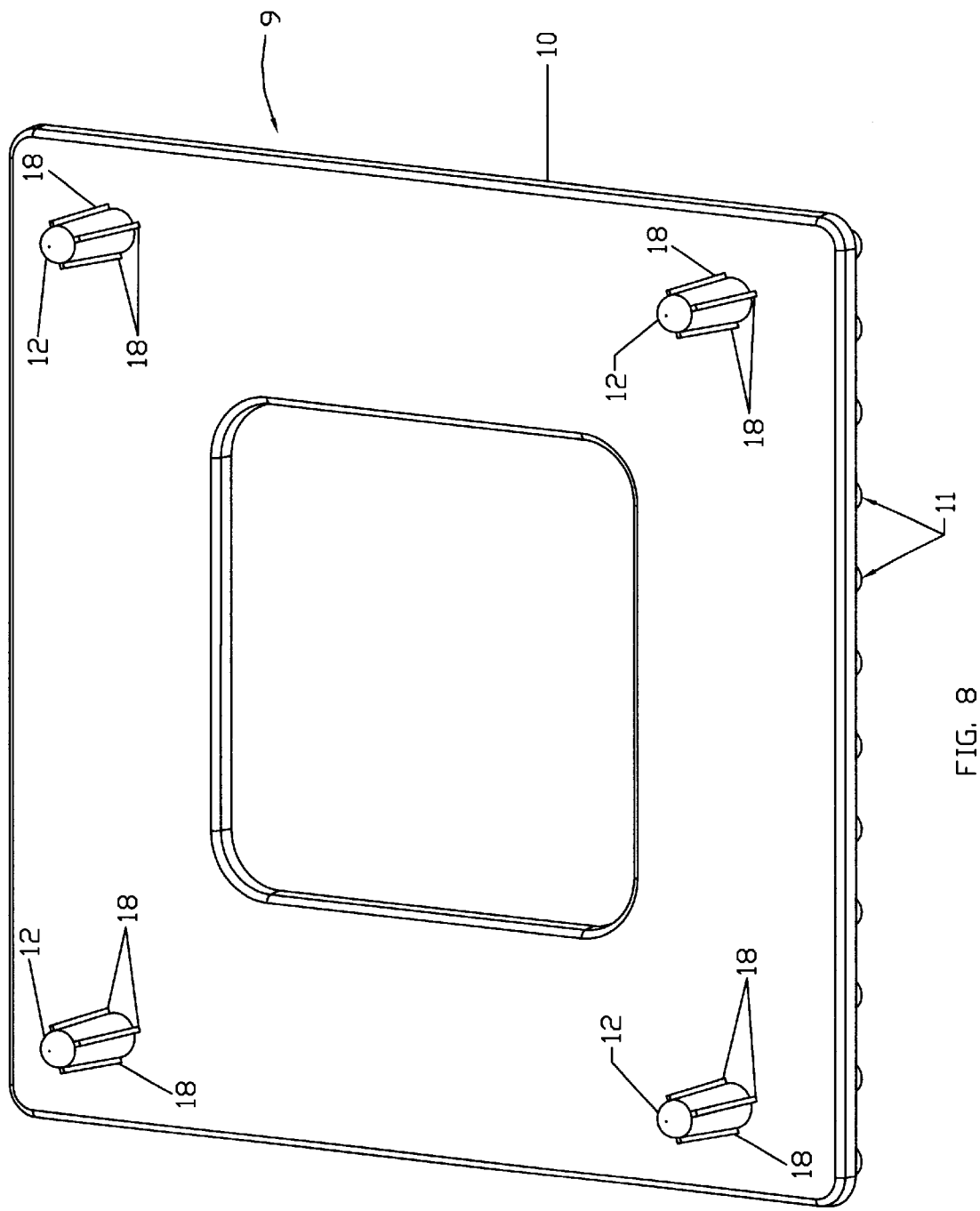
FIG. 8 is a bottom view of an abrasive resistant pad of the present invention.

The abrasive resistant pad 9 also contains self-locking dowels 12 extending downward from the pad. These self-locking dowels 12 are also made from high-density polyethylene and are incorporated into the abrasive resistant pad 9. These self-locking dowels 12 contain at least one vertical rib 18 aligned along the length of the self-locking dowel 12, as shown in FIG. 8. These self-locking dowels 12 are placed into the dowel holes 13 created on a surface 4 of the block and serves to lock the abrasive resistant pad 9 onto the block 1. This mechanism also allows for the pad 9 to be removed by upward pressure if removal is required.

The self-locking dowels 12 of the abrasive resistant pad 9 are placed in the dowel holes 13 of the block 1 as shown in FIG. 4, after the concrete has hardened. By placing the abrasive resistant pad 9 onto the block 1 after the concrete is hardened, the manufacturer and the consumer has much more flexibility in their use of the abrasive resistant pads 9 with the mat 20. For example, the pads may be manufactured separately and the entire mat 20 can be shipped without the pads 9 and the consumer can then place the pad 9 only on the blocks 1, which are needed. Additionally, if a pad 9 becomes damaged during transportation of the mat 20, then the consumer can simply replace the damaged pad with a new pad 9. The design of the present invention therefor provides the ability to separate the creation and manufacturing of the blocks with the attachment of the pads. Thus, the user may modify, potentially at the site of installation, the seabed mat according to the particular situation and installation, which is being protected.

Alternatively, the pads may also be securely affixed to the blocks by use of adhesives placed within the dowel holes of the blocks prior to insertion of the self-locking dowels in order to assure a more permanent fixation of the abrasive resistant pad 9 to the block 1.

Figure 9:
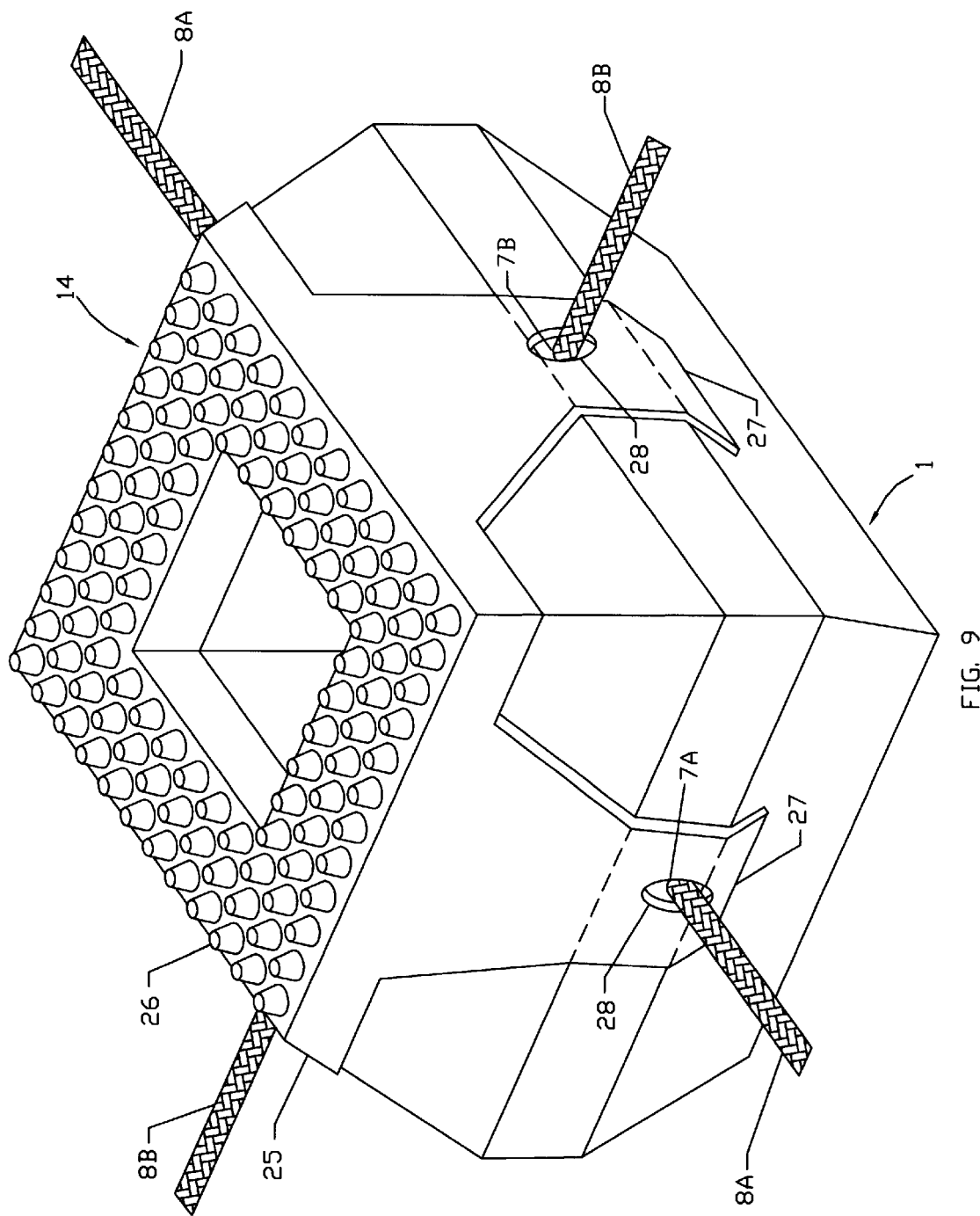
FIG. 9 is an alternative embodiment of an abrasive resistant pad used with the present invention.

An alternative embodiment of the present invention utilizes a saddle design abrasive resistant pad 14 and is shown in FIG. 9. This saddle pad 14 is comprised of a solid base 25 with a plurality of upwardly extending posts 26 extending outward from the base 25. The saddle pad 14 also has a plurality of downward extending legs 27 which extend over the apertures 7A and 7B on each side of the block 1. Each of the downward extending legs 27 of the saddle pad 14 has a matching aperture 28, which allows the cables 8A and 8B to extend through the legs 27 of the saddle pad 14 and into the block 1.

This method of connecting and securing the blocks 1 with the compression sleeve 16 allows for the size of the seabed mat 20 to be dynamically modified in order to accommodate the terrain on which it is being laid. Additionally, if the used of the seabed mat 20 wished to alter the mat 20 to accommodate a specific structure, such as a pipe valve, this modification of removing specific blocks 1 from the seabed mat 20, can be accomplished at the site of installation. Additionally, if a block 1 is broken during transportation or the process of installation, it can readily be replaced. Thus the present invention provides the ability to modify and repair the concrete seabed mat 20 at any location, not just during the manufacturing process, which provides the user of the mat with a degree of flexibility that is not available with other concrete mats.

We claim:

1. A seabed mat, comprising:
    a plurality of concrete blocks, each of said blocks having an opening extending therethough, a first and a second aperture extending through said block and perpendicular to each other and an upper surface and a lower surface, said upper surface having at least one dowel hole;
    a plurality of cables interconnecting said plurality of blocks;

a plurality of reattachable abrasive resistant pads, each of said abrasive resistant pads having:
a base portion;
an opening through said base portion and matching the position of said opening on each of said blocks;
a plurality of posts extending upward from said base portion;
at least one dowel extending downward from said base portion.

2. A mat of claim 1 wherein said upper surface of said block is further comprised of a plurality of dowel holes.

3. The mat of claim 1 wherein said plurality of blocks are removably affixed to said plurality of cables.

4. The mat of claim 3 wherein said mat is comprised of a plurality of rows and columns of said blocks, each of said pairs of rows and columns retained together by one and columns of said blocks, each of said pairs of rows retained together by one of of said plurality of said cables.

5. A mat of claim 4 wherein each of said cables forms a loop at both ends of respective columns and rows.

6. A mat of claim 5 wherein each piece of said cable is used to connect two rows or columns of said blocks.

7. A mat of claim 3 wherein said mat is capable of size modification after the manufacturing process.

8. A mat of claim 1 wherein said cable is comprised of a copolymer olefin fiber.

9. The mat of claim 1 further comprising a retaining mechanism for retaining said plurality of cables in end to end relationship.

10. The mat of claim 9 wherein said retaining mechanism is comprises of a compression sleeve.

11. The mat of claim 10 wherein said compression sleeve is comprised of a first and a second cylindrical opening in adjacent relationship, said compression sleeve interconnecting the ends of each of said plurality of said cables.

12. The mat of claim 10 wherein said compression sleeve detachably connects said ends of each of said plurality of said cables.

13. The mat of claim 10 wherein said compression sleeve is comprised of a deformable material.

14. A mat of claim 10 wherein said compression sleeve is a first pre-selected diameter, said first and second apertures of each of said blocks being a second pre-selected diameter, said first pre-selected diameter being larger than said second pre-selected diameter.

15. A mat of claim 1 wherein said blocks are arranged in rows and columns to form a grid formation with sufficient space between each of said blocks to allow adjacent blocks to articulate.

16. A mat of claim 1 wherein said blocks have an upper and lower trapezoidal shape with the lower rectangular portions abutting each other and the upper portions being truncated.

17. A mat of claim 1 wherein said opening in each block is a single square opening.

18. A mat of claim 1 wherein the perpendicular apertures are situated so as to allow cables to pass through said perpendicular apertures without intersecting.

19. A mat according to claim 1 wherein an adhesive is placed in the dowel holes of the said upper surface of said block.

20. A mat of claim 1 wherein said abrasive resistant pad is made of high-density polyethylene.

21. A mat of claim 1 wherein said abrasive resistant pad is attached to each of said blocks.

22. A mat of claim 1 wherein an adhesive is placed in said dowel holes on said upper surface of said block.

23. A seabed mat, comprising:
a plurality of concrete blocks, each of said blocks having an opening extending therethough, perpendicular apertures and an upper surface and lower surface, said upper surface having at least one dowel hole;
a plurality of cable pieces interconnecting said plurality of blocks;
a plurality of reattachable abrasive resistant pads, each of said abrasive resistant pads having:
a base portion;
an opening through said base portion and matching the position of said opening on each of said blocks;
a plurality of posts extending upward from said base portion;
a plurality of downward extending legs with an aperture on each leg and matching the position of said perpendicular apertures on said block.

24. A seabed mat comprising:
a plurality of blocks, each of said blocks having an upper and lower trapezoidal shape with the lower rectangular portions abutting each other and the upper portions being truncated, forming a top and bottom surface, with said blocks having:
an single square opening extending therethrough;
a first and second aperture extending through said block and perpendicular to each other;
at least one dowel hole on said upper surface of said block; and
said blocks arranged in rows and columns to form a mat, with sufficient space between each of said blocks to allow adjacent blocks to articulate;
at least one reattachable abrasive resistant pad, each of said abrasive resistant pad having:
a solid base portion;
an single square opening through said base portion and matching the position of said opening on each of said blocks;
a plurality of posts extending upward from said bas portion; and
a plurality of downward extending legs with an aperture open each leg and matching the position of said perpendicular apertures on said block
a plurality of cables interconnecting said plurality of blocks by passing through said perpendicular apertures on said blocks, forming the plurality of blocks into rows and columns and extending from the end of each of the rows and columns forming a loop at each end; and
a compression sleeve attached to said cables at the point where said cable extends from end of said rows and columns of said blocks.

25. A seabed mat comprising:
a plurality of blocks, each of said blocks having an upper and lower trapezoidal shape with the lower rectangular portions abutting each other and the upper portions being truncated, forming a top and bottom surface, with said blocks having:
an single square opening extending therethrough;
a first and second aperture extending through said block and perpendicular to each other;
at least one dowel hole on said upper surface of said block; and
said blocks arranged in rows and columns to form a mat, with sufficient space between each of said blocks to allow adjacent blocks to articulate;
at least one reattachable abrasive resistant pad, each of said abrasive resistant pad having:

a solid base portion;

an single square opening through said base portion and matching the position of said opening on each of said blocks;

a plurality of posts extending upward from said base portion; and at least one dowel extending downward from said base portion with said dowel having a least one vertical rib formed thereon;

a plurality of cables interconnecting said plurality of blocks by passing through said perpendicular apertures on said blocks, forming the plurality of blocks into rows and columns and extending from the end of each of the rows and columns forming a loop at each end; and a compression sleeve attached to said cables at the point where said cable extends from end of said rows and columns of said blocks.

26. A reattachable abrasive resistant pad used in combination with a seabed mat, said pad comprising:

a base portion forming a square segment;

an opening extending through said base portion;

a plurality of posts extending upward from said square segment; and, a plurality of dowels extending downward from said square segment, each of said plurality of dowels having at least one vertical ribs formed thereon.

27. A reattachable abrasive resistant pad used in combination with a seabed mat, said pad comprising:

a base portion forming a square segment;

an opening extending through said base portion;

a plurality of posts extending upward from said square segment; and a plurality of downward extending legs, each containing an aperture.

* * * * *